(12) United States Patent
Singh

(10) Patent No.: US 8,983,749 B1
(45) Date of Patent: Mar. 17, 2015

(54) ROAD FRICTION ESTIMATION SYSTEM AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/061,793

(22) Filed: Oct. 24, 2013

(51) Int. Cl.
*B60B 39/00* (2006.01)
*B60T 8/172* (2006.01)

(52) U.S. Cl.
CPC .................................... *B60T 8/172* (2013.01)
USPC .......................................................... 701/71

(58) Field of Classification Search
USPC .......................................................... 701/71
See application file for complete search history.

(56) References Cited

U.S. PATENT DOCUMENTS

| | | | |
|---|---|---|---|
| 7,546,764 B2 | 6/2009 | Morinaga et al. | 73/146 |
| 7,552,628 B2 | 6/2009 | Mancosu et al. | 73/146 |
| 2006/0191729 A1* | 8/2006 | Billig et al. | 180/247 |
| 2008/0103659 A1 | 5/2008 | Mancosu et al. | 701/41 |
| 2009/0055040 A1 | 2/2009 | Nagaya | 701/29 |
| 2010/0077847 A1* | 4/2010 | Joe et al. | 73/146 |
| 2010/0179796 A1* | 7/2010 | Miyamoto | 703/8 |
| 2011/0125455 A1* | 5/2011 | Nardi et al. | 702/142 |
| 2011/0199201 A1 | 8/2011 | Brusarosco et al. | 340/438 |
| 2011/0218706 A1* | 9/2011 | Mori et al. | 701/36 |
| 2012/0185142 A1* | 7/2012 | Meyers et al. | 701/70 |
| 2012/0191282 A1* | 7/2012 | Maki | 701/22 |
| 2013/0218396 A1* | 8/2013 | Moshchuk et al. | 701/25 |

FOREIGN PATENT DOCUMENTS

WO    2011/054363    5/2011    ......... B60G 17/0165

* cited by examiner

*Primary Examiner* — Hussein A Elchanti
(74) *Attorney, Agent, or Firm* — Richard B. O'Planick

(57) ABSTRACT

A road friction coefficient estimation system and method uses tire load estimation sensors attached to a vehicle's tires. Tire load and slip angle for each tire are estimated from sensor data. From vehicle CAN bus sensors, vehicle acceleration and yaw rate operational parameters are obtained and a dynamic observer model calculates lateral and longitudinal force estimates on each of the tires. An individual wheel force estimation is calculated on each tire from the lateral and longitudinal force estimates for each tire. From the dynamic slip angle estimation on each tire and the individual wheel force estimation on each of the tires, a model-based friction estimation is made.

19 Claims, 15 Drawing Sheets

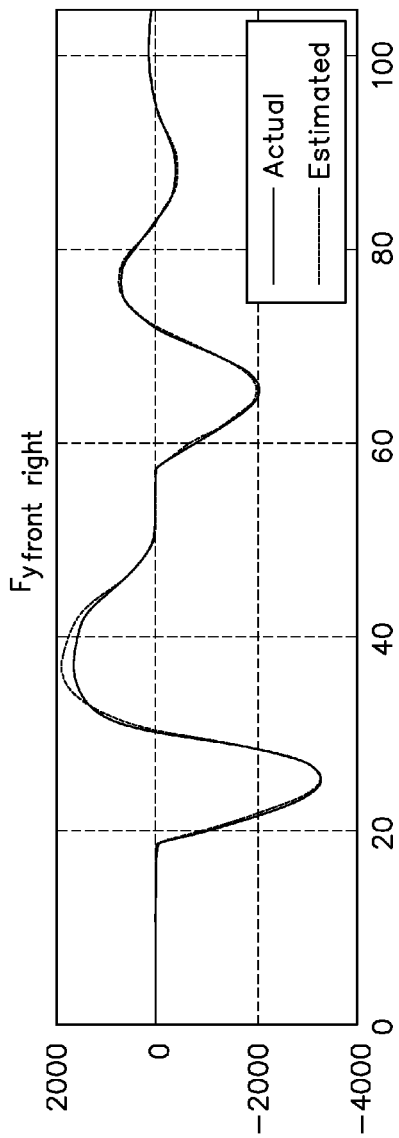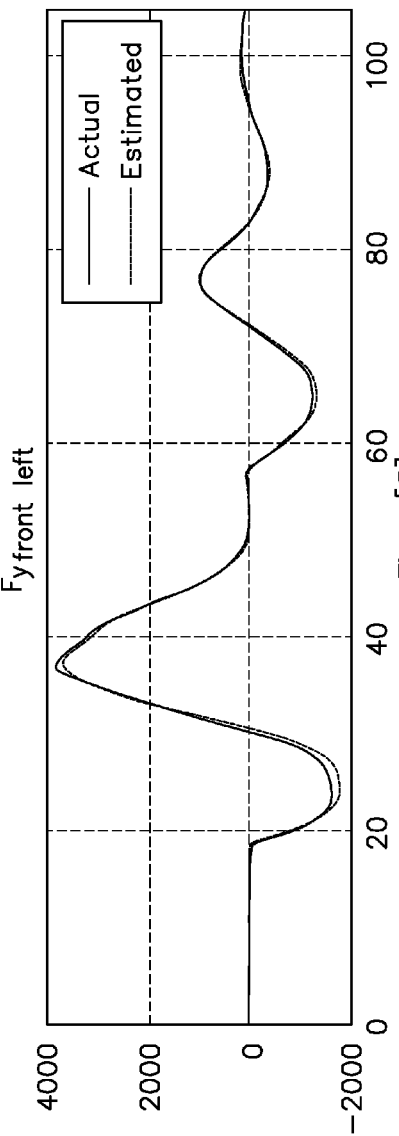
FIG-5A
FIG-5B

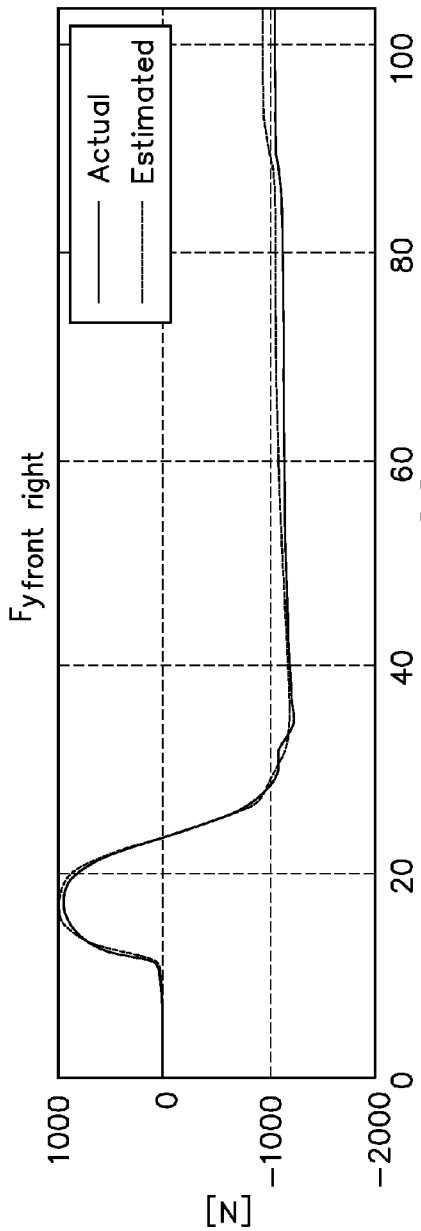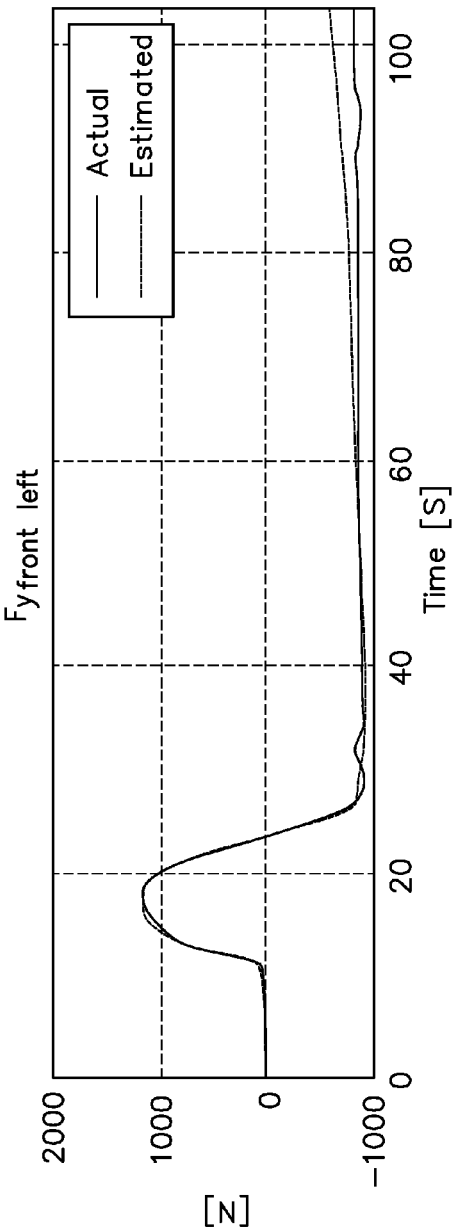

ROAD FRICTION ESTIMATION SYSTEM AND METHOD

FIELD OF THE INVENTION

The invention relates generally to tire monitoring systems for collecting measured tire parameter data during vehicle operation and, more particularly, to a system and method for estimating road friction estimation based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as the condition of the road surface including the road friction coefficient is an important considerations for vehicle operation and safety. It is accordingly further desirable to measure road friction and communicate road friction information to a vehicle operator and/or vehicle systems such as braking and stability.

SUMMARY OF THE INVENTION

According to an aspect of the invention a road friction coefficient estimation system and method is provided for calculating a road friction coefficient estimation. In a vehicle having a plurality of supporting tires, tire load estimation sensors are attached for estimating a dynamic load estimation on each of the plurality of tires. Tire slip angle calculation is conducted utilizing load estimation sensor data, whereby a dynamic slip angle estimation on each of the plurality of tires is made. From vehicle CAN bus sensors, vehicle acceleration and yaw rate operational parameters are obtained and a dynamic observer model calculates lateral and longitudinal force estimates on each of the plurality of tires. A load transfer ratio is estimated from the estimated dynamic load on each of the plurality of tires; and an individual wheel force estimation is calculated on each of the plurality of tires from the lateral and longitudinal force estimates on each of the plurality of tires. From the dynamic slip angle estimation on each of the plurality of tires and the individual wheel force estimation on each of the plurality of tires, a model-based friction estimation is made.

In another aspect, the friction estimation is conducted in real time based upon the tire sensor-obtained variables of slip angle and tire load and observer-derived estimations of forces on each of the plurality of tires.

In a further aspect, the dynamic observer model comprises a single-track, three degree-of-freedom model; the road friction coefficient estimation is made following a four-wheel vehicle model; and the road friction coefficient estimation is made utilizing a Brush-tire model.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Brush model" means a one-dimensional quasi-static mechanical analog system used for analysis of rolling resistance. In the Brush model, the contact patch is divided into two sections: a forward static region where the tire tread adheres to the road surface, and an aft slide region where sliding occurs between tire and road.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIGS. 5A and 5B are graphs showing lateral force estimated vs. actual for the front right and front left tires, respectively.

FIGS. 8A and 8B are graphs showing lateral force estimated vs. actual for the right and left front tires, respectively.

DETAILED DESCRIPTION OF THE INVENTION

Figure 1:
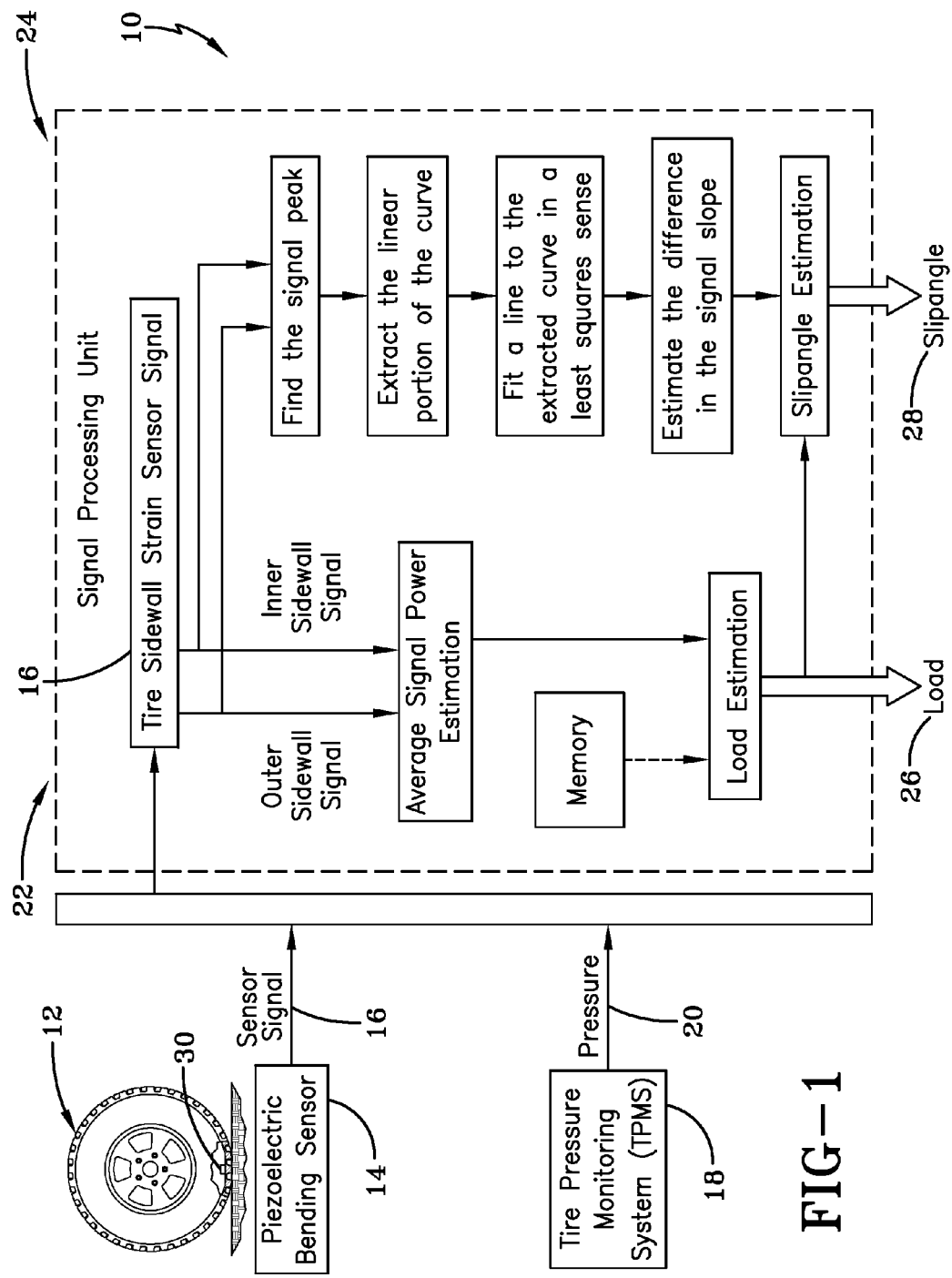
FIG. 1 is a block level diagram of the system employed in the estimation of slip angle and load on a vehicle's tires.

Referring first to FIG. 1, a strain sensor system and method of estimating a tire load and a tire slip angle is shown in a block level diagram. The load on a vehicle tire may be estimated by a tire based sensor system employing one or, preferably, a pair of strain or bending sensors 14 mounted to a tire at opposite sidewall locations 30. The strain sensors react to the sidewall deflections of the tire and, in measuring the extent of deflection, provide a basis for estimating both load and slip angle of the tire. A signal 16 from each of the bending sensors 14 is transmitted to a signal processor as will be explained. In addition, a tire pressure monitoring system 18 is mounted to the tire and functions to measure and transmit tire pressure data 20 to the signal processing unit. The tire sidewall strain sensor signal(s) are used in parallel signal processing paths; a first path which uses the signal (s) 16 to estimate tire load, indicated by path 22. The second processing path, indicated at numeral 24, uses the sidewall deflection information to estimate slip angle. Co-pending U.S. patent application Ser. No. 13/609,695, filed Sep. 11, 2012, entitled "TIRE SIDEWALL LOAD ESTIMATION SYSTEM AND METHOD", teaches the methodology and system of path 22 and is incorporated herein in its entirety by reference. The system is used on a vehicle equipped with tires of conventional construction, having a tread component at a tire crown region which contacts a ground surface during rolling operation. The tire mounts to a rim in conventional manner. The sensors are preferably piezoelectric bending sensors, or other suitable strain sensors commercially available, of a type operational to bend and reconfigure when subjected to a bending force and thereupon generate an electrical signal indicative of the magnitude of bending reconfiguration in the sensor body. The bending signals are thus indicative of the magnitude of the bending strain within the sidewall to which the sensor is attached. When the bending force is removed, the sensor resumes its original configuration. By way of example, without intent to limit the scope of the invention, a piezoelectric bending sensor such as bending film sensor commercially offered by Measurement Specialties, Inc. located at 1000 Lucas Way, Hampton, Va. 23666 may be employed.

In addition, the lateral sidewall deflection of the tire is analyzed for the purpose of estimating the slip angle of the tire as indicated by the vertical block path 24. "Slip Angle" is the angle between a vehicle's direction of ravel and the direction in which the front wheels are pointing. Slip angle is a measurement of the deviation between the plane of tire rotation and the direction of travel of a tire. The slip angle of a moving vehicle tire is useful information in vehicle control and stability systems. As braking and other control systems in vehicles become more interrelated, an estimation of tire slip angle is useful in stability and control system such as anti-locking brakes. A slip angle estimation system is taught and disclosed by co-pending U.S. Patent Application Ser. No. 61/734,526 filed Dec. 7, 2012, entitled "Tire Slip Angle Estimation System and Method", likewise incorporated herein in its entirety by reference. The sensor signal(s) are analyzed by finding the signal peak, extracting the linear portion of the curve, and fitting a line to the extracted curve in a least squares sense. An estimate of the difference in the signal slope provides a basis for concluding the slip angle present in the tire. The signal processing represented by sequential steps of processes 22, 24 result in an estimation of tire load 26 and 28 on a continual basis as the tire is in use. Each tire is analyzed in respective application of processes 22, 24 to generate the load and slip angle for each using sidewall deflection information.

In addition to the sensor signals from the inner and outer sidewall sensors, inflation pressure is measured by a tire pressure monitoring system (TPMS) mounted to the tire, of a type commercially available. The TPMS system includes a pressure sensor that mounts to a tire in communication with an internal tire air cavity and functions to measure the air pressure within the tire cavity and transmit the measured pressure data to a receiver. The measurement of the TPMS may further include a temperature sensor that measures tire temperature. Measured pressure value is transmitted by the TPMS system for inclusion in the load and slip angle estimations 22, 24.

Figure 2:
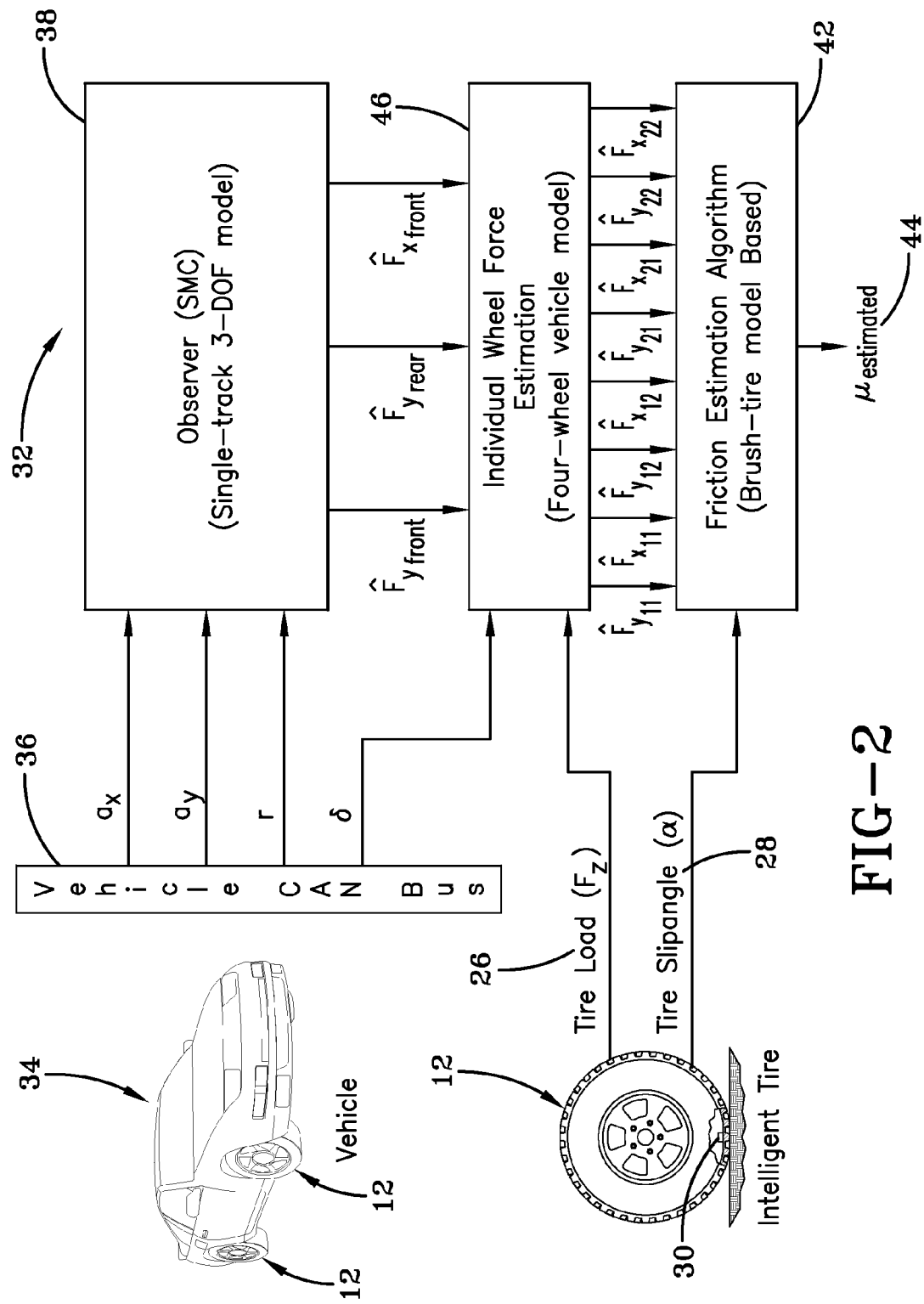
FIG. 2 is a block level diagram of the system for using tire load and slip angle of FIG. 1 with the vehicle CAN Bus parameters in the estimation of wheel force and coefficient of friction.

Pursuant to the invention, a modeling procedure is adopted utilizing the load and slip angle estimation of FIG. 1 in the coefficient of friction estimation system and methodology represented in block diagram form by FIG. 2. The modeling procedure adopted is summarized in the following table.

TABLE 1

| S. No | System | Modeling Procedure Adopted | System Output |
|---|---|---|---|
| 1 | Vehicle | 8-DOF non-linear vehicle model | $a_Y, a_X, r$ |
| 2 | Tire model + Intelligent tire emulator | Combined-slip tire model-Magic Formula and Dugoff tire models | $F_Z, \alpha$ |
| 3 | Driver model | Single-point preview driver model | $\delta$ |
| 4 | Observer | Sliding mode observer (SMC)-Single-track 3-DOF model based | $\hat{F}_{y_{Front}}, \hat{F}_{y_{Rear}}, \hat{F}_{x_{Front}}$ |
| 5 | Individual wheel force estimation | Four-wheel vehicle model | $\hat{F}_{y_{fl}}, \hat{F}_{x_{fl}}, \hat{F}_{y_{fr}}, \hat{F}_{x_{fr}}$, $\hat{F}_{y_{rl}}, \hat{F}_{x_{rl}}, \hat{F}_{y_{rr}}, \hat{F}_{x_{rr}}$ |
| 6 | Friction estimation algorithm | Artificial neural network (ANN) based | $\mu_{estimated}$ |

Figure 13:
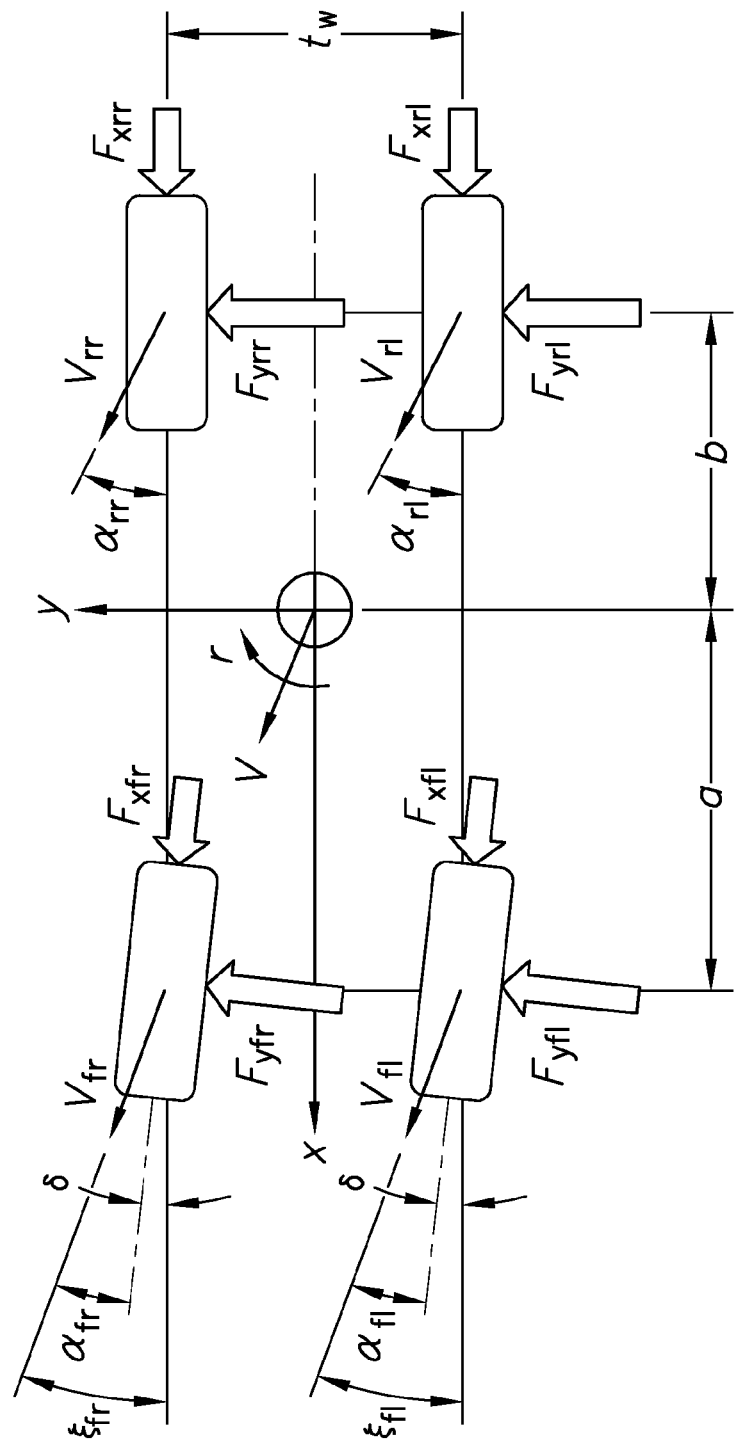
FIG. 13 is a force diagram for a four wheeled vehicle.

$a_Y$: Lateral acceleration
$a_X$: Longitudinal acceleration
r: Yaw rate
$F_Z$: Tire normal load
$\alpha$: Tire slipangle
$\hat{F}_{y_{Front}}$: Total lateral force on the front tires
$\hat{F}_{y_{Rear}}$: Total lateral force on the rear tires
$\hat{F}_{x_{Front}}$: Total longitudinal force on the front tires
$\hat{F}_{y_{fl}}, \hat{F}_{x_{fl}}, \hat{F}_{y_{fr}}, \hat{F}_{x_{fr}}, \hat{F}_{y_{rl}}, \hat{F}_{x_{rl}}, \hat{F}_{y_{rr}}, \hat{F}_{x_{rr}}$: Individual wheel forces
$\mu_{estimated}$: Estimated tire-road friction coefficient Using the above modeling procedure, the functional block diagram of FIG. 2 demonstrates coefficient of friction estimation in an exemplary four-wheeled vehicle 34. The system may be adapted to vehicles having more or fewer wheel assemblies if desired. The vehicle 34 is equipped with four tire/wheel assemblies 12. Vehicle based sensors are employed for the purpose of providing by means of vehicle CAN Bus 36 lateral and longitudinal acceleration data $a_x$, $a_y$; and yaw rate "r" in a single point preview driver model output $\delta$. An observer 38 receives as input CAN Bus acceleration data $a_x$, $a_y$; and yaw rate "r" data. The observer 38 is a sliding mode observer (SMC)-Single-track 3 degree of freedom (DOF) model. From the CAN-Bus data, the observer 38 functions to output total lateral force on the front and rear tires and total longitudinal force on the front tires for estimation of individual wheel force 40, using a four-wheel vehicle model as shown in FIG. 13.

The model may be implemented using any conventional commercial mathematical simulation tool such as, but not limited to Simulink commercially available from The Mathworks, Inc. located at 3 Apple Hill Drive, Natick, Mass. 01760. Simulink® is a block diagram environment for multi-domain simulation and model based design. It supports system-level design, simulation, automatic code generation, and continuous test and verification of embedded systems. Simulink provides a graphical editor, customizable block libraries, and solvers for modeling and simulating dynamic systems. It is integrated with MATLAB®, enabling a user to incorporate MATLAB algorithms into models and export simulation results to MATLAB for further analysis.

From the observer generated lateral and longitudinal force estimations, individual wheel force estimations (block 40) are made using the above four-wheel vehicle model. The individual wheel force estimation outputs are applied to the friction estimation algorithm (Brush-tire model based) as shown by block 42, resulting in an estimation of road surface coefficient of friction 44. The "Brush Tire Model" represents a one-dimensional quasi-static mechanical analog system used for analysis of rolling resistance. In the Brush model, the contact patch is divided into two sections: a forward static region where the tire tread adheres to the road surface, and an aft slide region where sliding occurs between tire and road.

The observer performance and analytical results were validated experimentally for two extreme cornering maneuvers:
1. Double lane change (on high-mu conditions) and
2. Fish hook maneuver (on low-mu surface conditions).
The observer Gains:
K1=100
K2=1000000
K3=10
K4=10000
K5=100
K6=100000

Figure 3A:
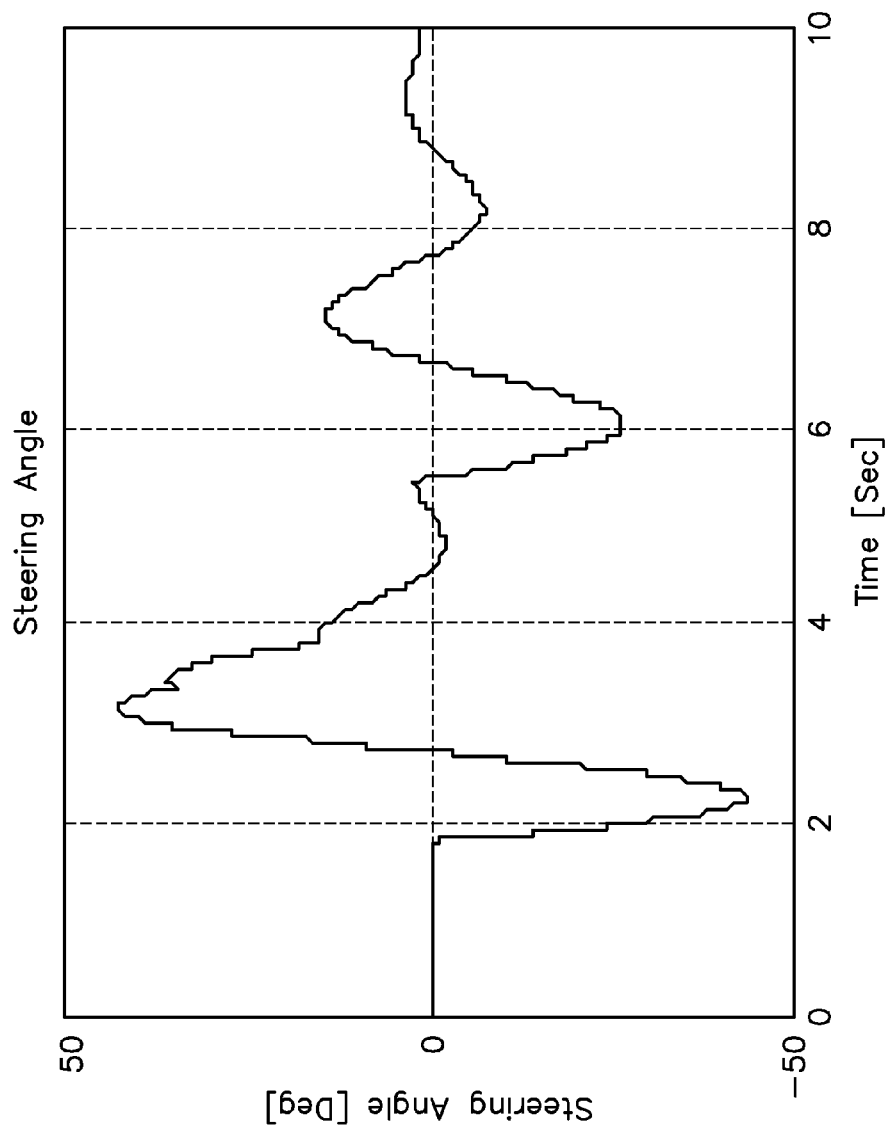
FIG. 3A is a graph of steering angle over time used in conducting system verification.
Figure 3B:
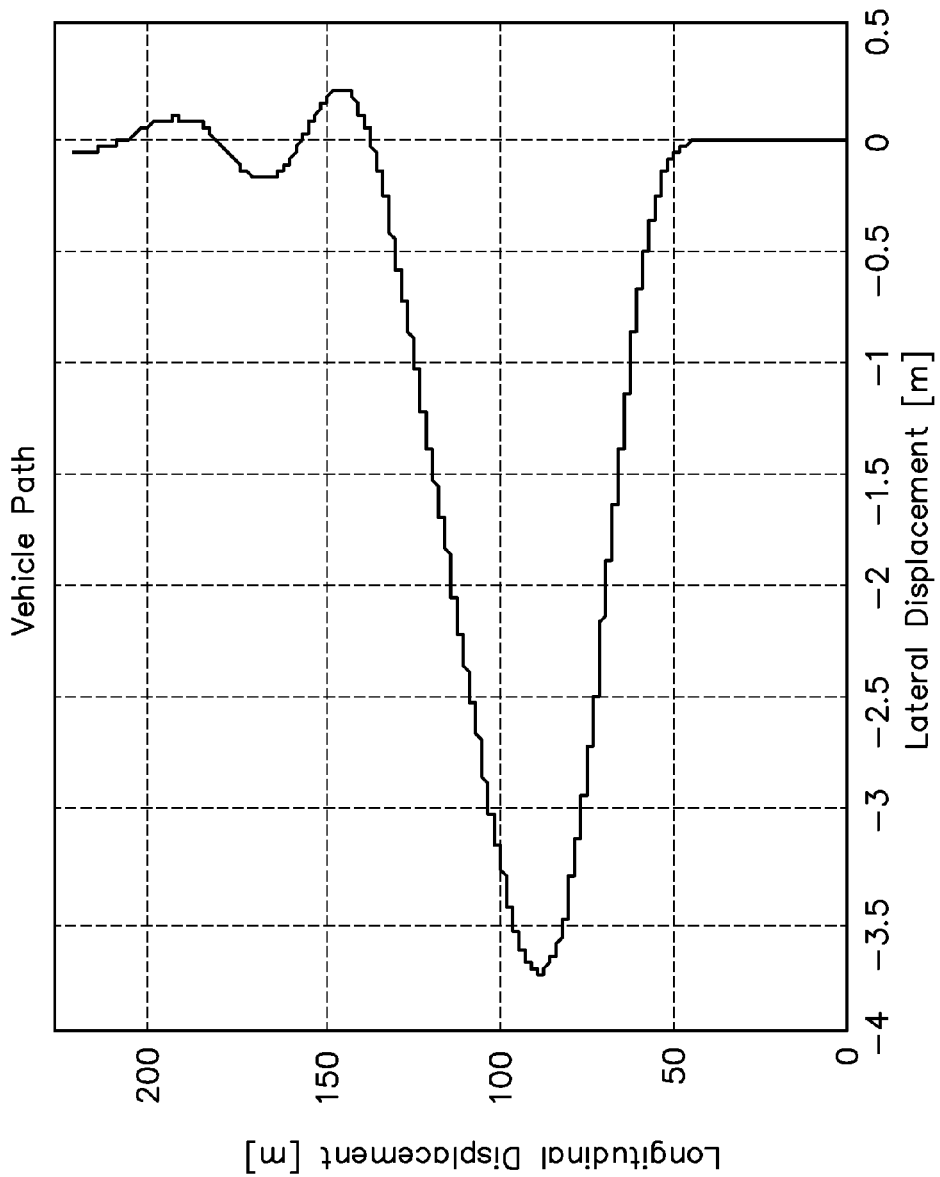
FIG. 3B is a graph of lateral displacement [m] vs. longitudinal displacement [m] along a vehicle experimental path.
Figure 4A:
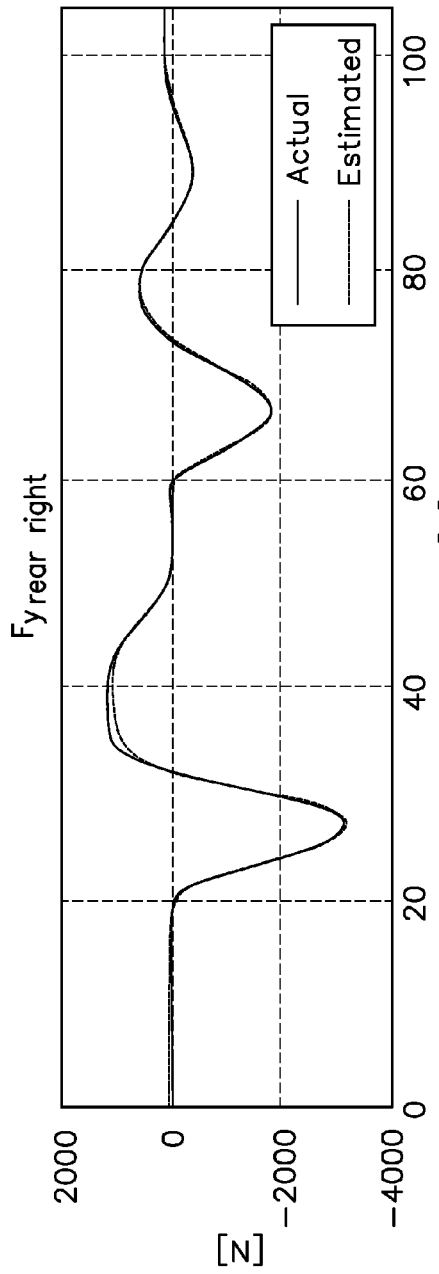
FIG. 4A is a graph of lateral force $F_y$ on the rear right tire over the path showing actual force and estimated.
Figure 4B:
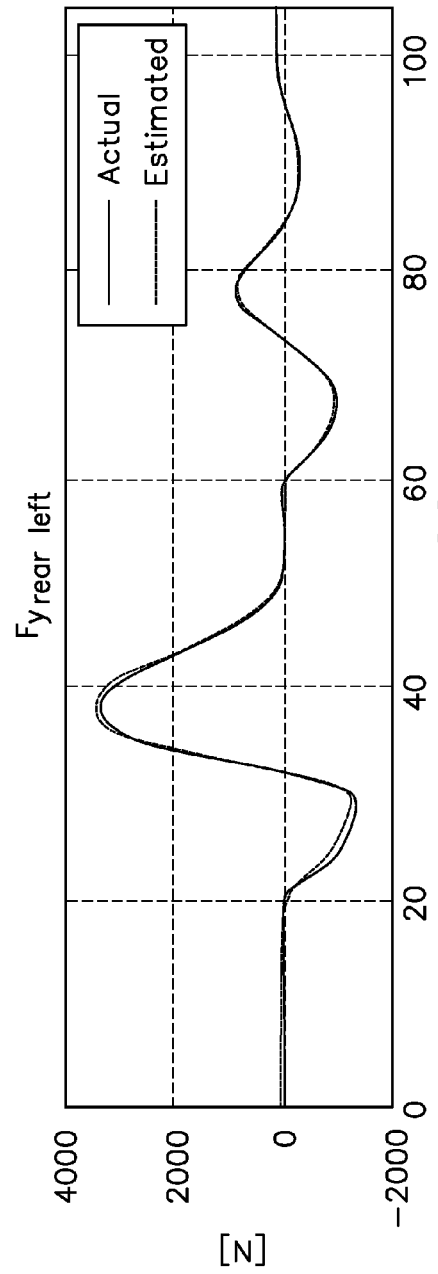
FIG. 4B is a graph of lateral force $F_y$ on the rear left tire over the path showing actual vs. estimated comparative results.

The observer gains were optimized using an iterative process. FIG. 3A shows a graph of the steering angle vs. time in the double lane change maneuver on a road surface having a high mu condition of 0.8. FIG. 3B shows a vehicle path graphing longitudinal displacement [m] vs. lateral displacement [m]. Estimation results are represented by FIGS. 4A, 4B, 5A, and 5B graphing $F_y$ [N] vs. time for the rear right, rear left, front right, and front left tires, respectively, for the double lane change maneuver (1). The close correlation between the actual and estimated force values validates the accuracy of the estimation approach.

Figure 6A:
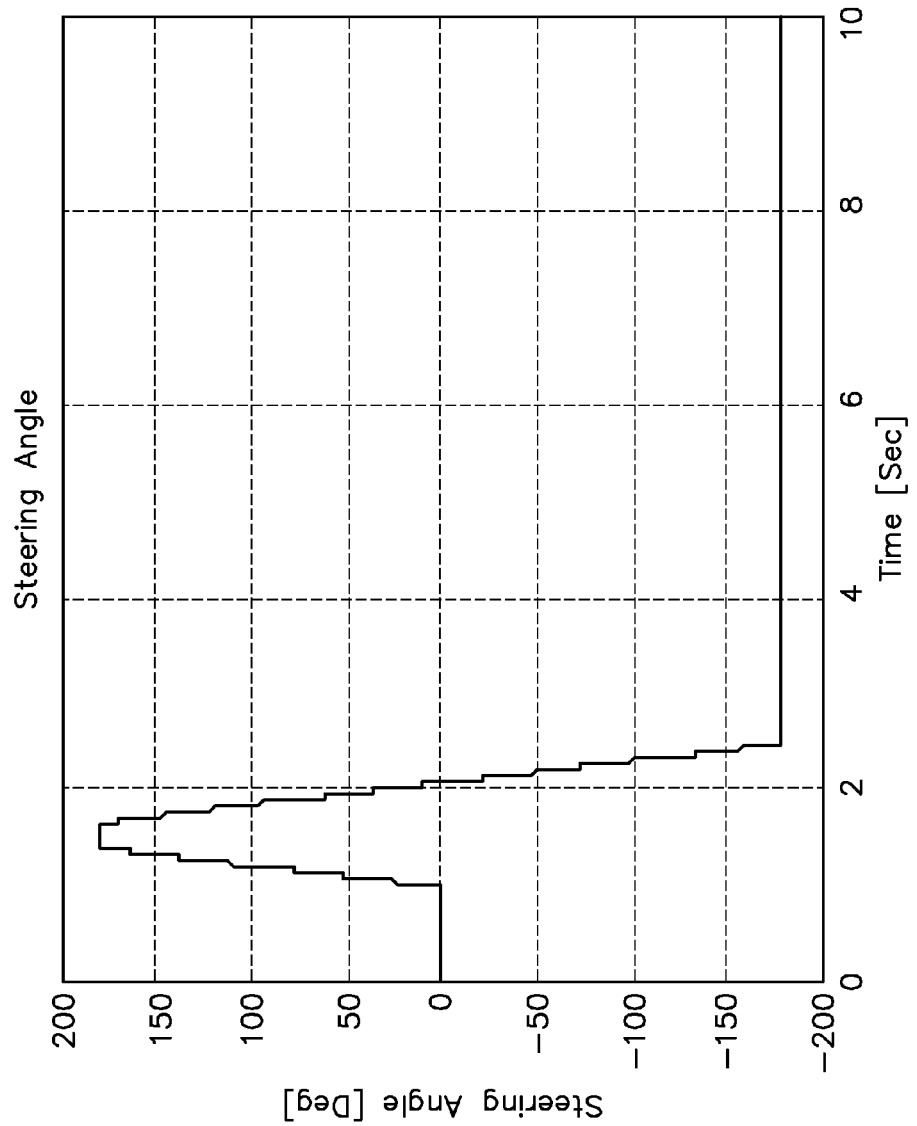
FIG. 6A is a graph showing steering angle over time for the experimental vehicle path.
Figure 6B:
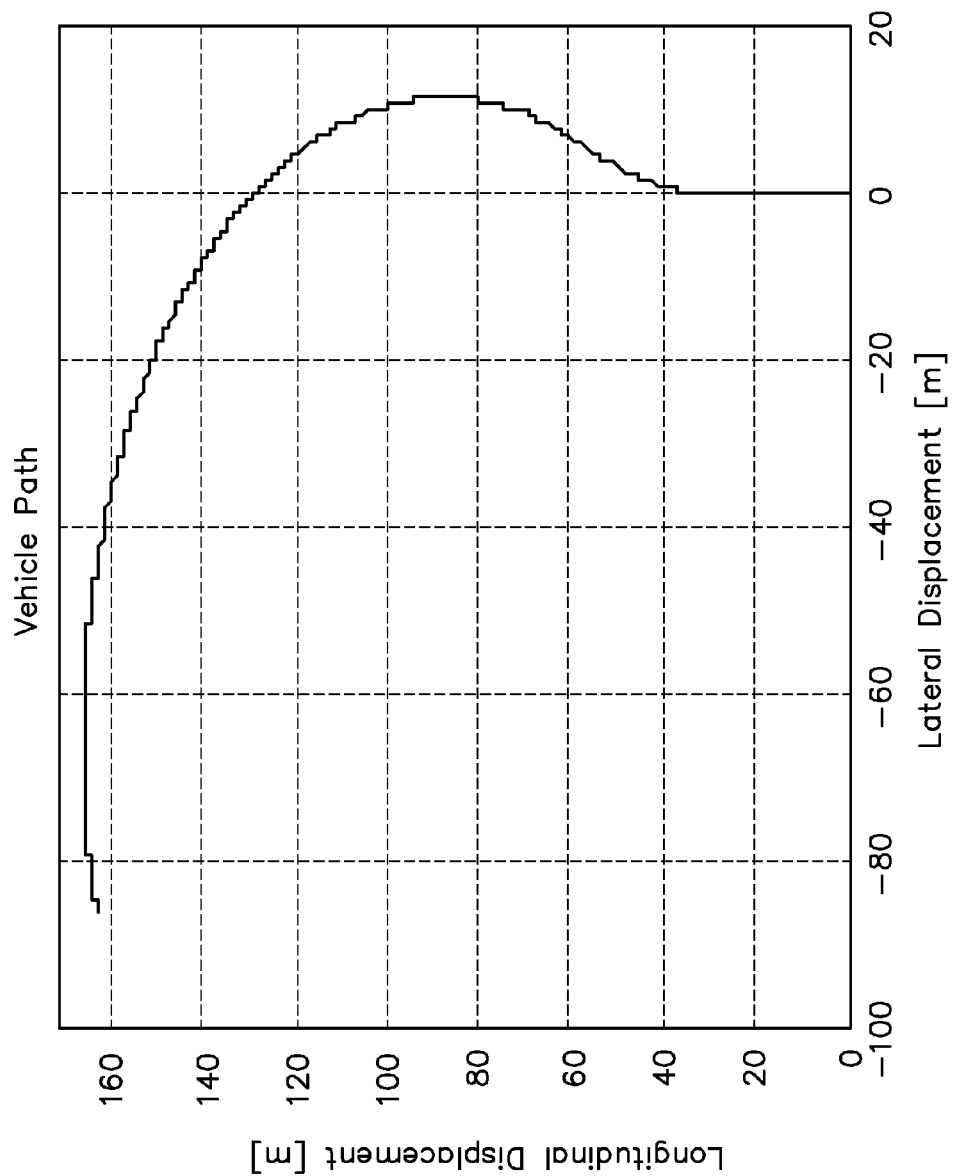
FIG. 6B is a graph of longitudinal displacement [m] vs. lateral displacement [m] over the experimental vehicle path.
Figure 7A:
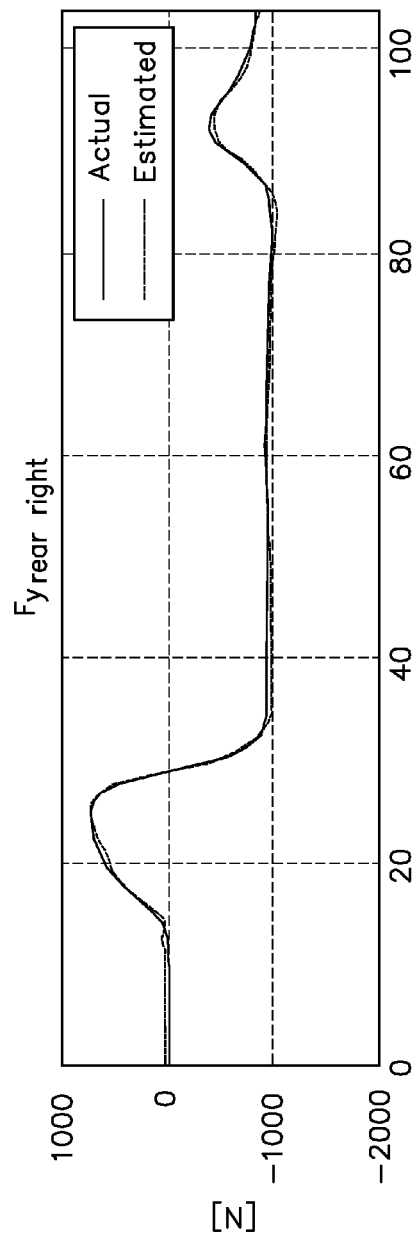
FIGS. 7A and 7B are graphs showing lateral force estimated vs. actual for the right and left rear tires, respectively.
Figure 7B:
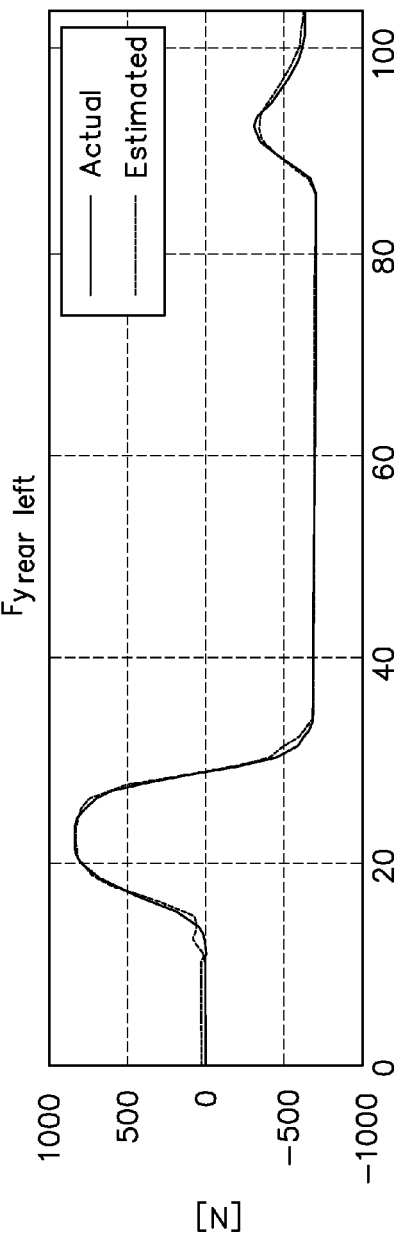

Referring to FIGS. 6A, 6B experimental results are shown for the second extreme cornering maneuver, that of a fish hook. In FIG. 6A, with a road surface condition of low mu (approx. 0.2) the steering angle [Deg] is graphed over time. In FIG. 6B, the vehicle path is graphed as longitudinal displacement vs. lateral displacement [m] and approximates the shape of a fishhook. Estimation results are represented by FIGS. 7A, 7B, 8A and 8B graphing $F_y$ [N] vs. time for the rear right, rear left, front right, and front left tires, respectively, for the fish-hook path of maneuver (2). As with the lane change path, the close correlation between the actual and estimated force values validates the accuracy of the subject observer estimation approach.

Figure 9:
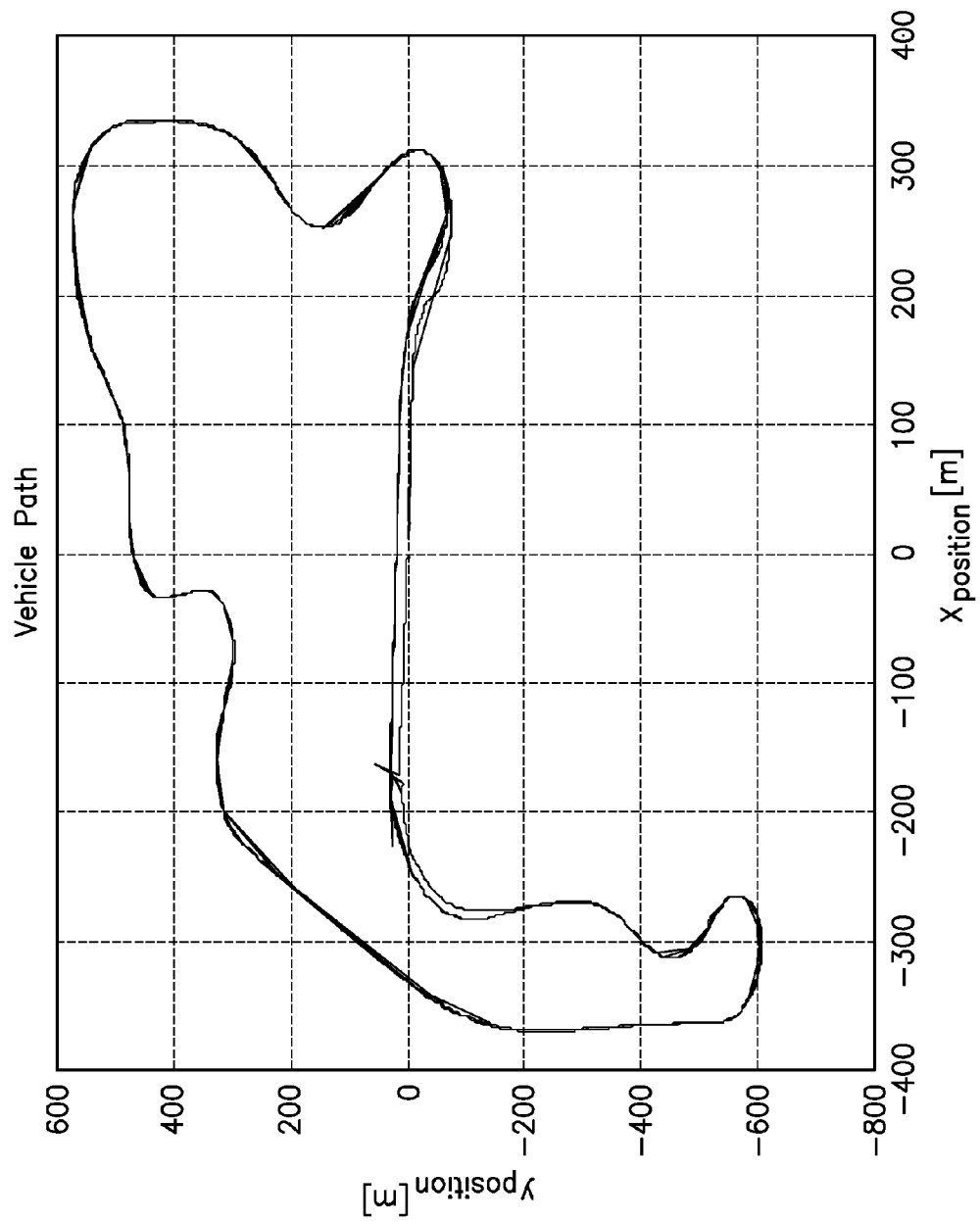
FIG. 9 is a graph of an experimental vehicle path showing y and x vehicle position coordinates.
Figure 10A:
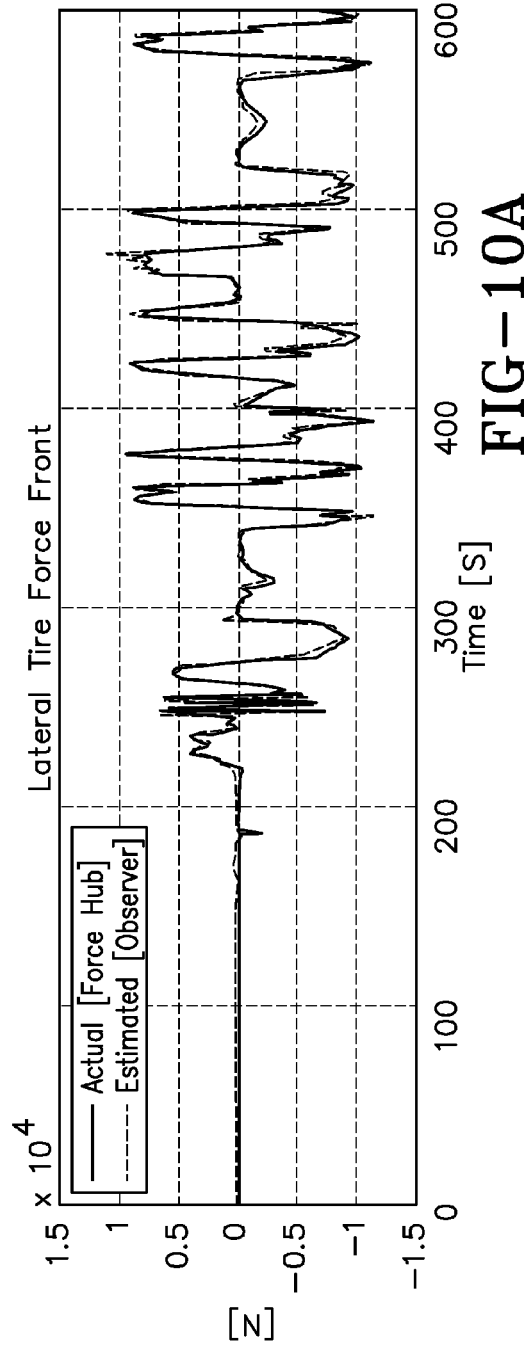
FIGS. 10A and 10B are graphs showing lateral tire force actual (Force Hub) vs. Estimated (Observer) comparative results.
Figure 10B:
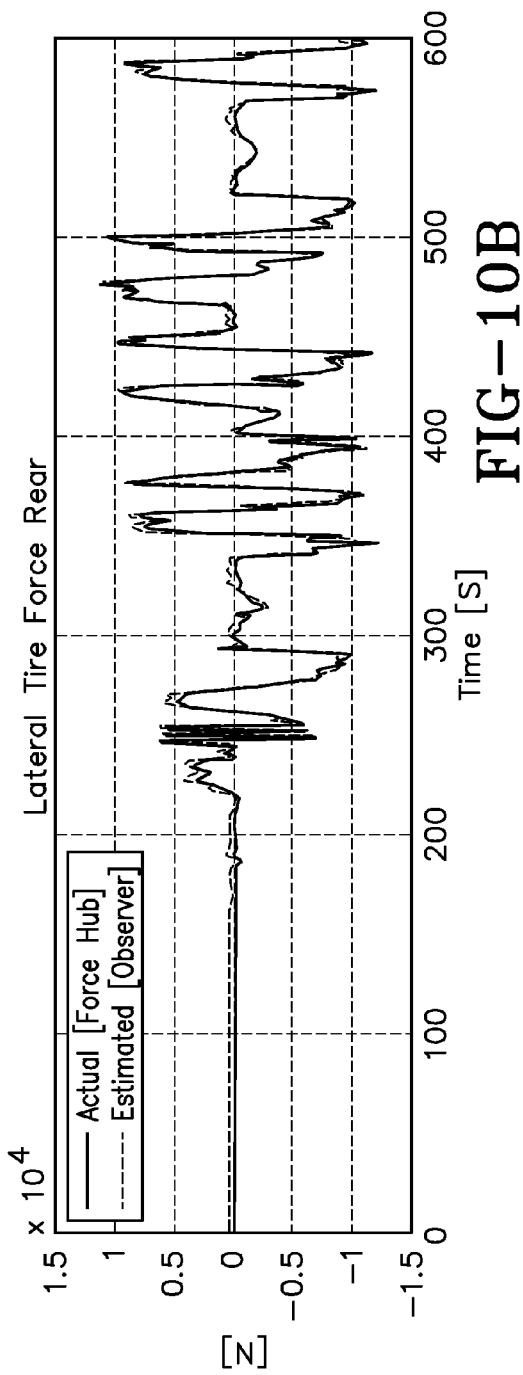

In FIG. 9, observer performance and experimental results are analyzed for a closed loop (y vs. x position) vehicle path followed by an experimental vehicle instrumented with an IMU (Inertial Measurement Unit) and force hubs of a type commercially available. An IMU is typically equipped to combine 3-axis accelerometers, 3-axis gyros, and/or 3-axis magnetic sensors for computing and outputting in real-time drift free three dimensional vehicle orientations that are continuous over a complete 360 degrees of motion. From the IMU, measurements of acceleration $a_x$, $a_y$, and yaw rate "r" are provided from the vehicle CAN Bus and inputted into the observer. The observer is set for the purpose of the conducted experiment to have Observer Gains of K1=5, K2=500, K3=50, K4=50, K5=1200 and K6=1000. FIG. 10A shows estimation results vs. actual [obtained from a force hub] for lateral tire force front; FIG. 10B for lateral tire force rear. The close correlation between estimated and actual results again confirms the validity of the subject observer-based estimation system and methodology.

Once the vehicle CAN Bus information is used to make an estimate of the tire lateral and longitudinal forces ($F_x$, $F_y$) using the dynamic observer 38 (FIG. 2), a sensor fusion approach is used. The sensor fusion approach combines the intelligent tire and vehicle information of tire load provided by the tire based TPMS unit 18 and the strain sensors 14 with the CAN bus information ($a_x$, $a_y$, and yaw rate "r") to estimate the individual wheel forces (using the Four-wheel Vehicle Model). A road friction estimation algorithm then utilizes the individual wheel forces and slip angle estimation to estimate the road surface coefficient of friction as explained below.

The friction estimation algorithm utilizes the $F_x$, $F_y$, and $F_z$ (longitudinal, lateral, and normal) load estimations applied to the Brush tire model.

Figure 11:
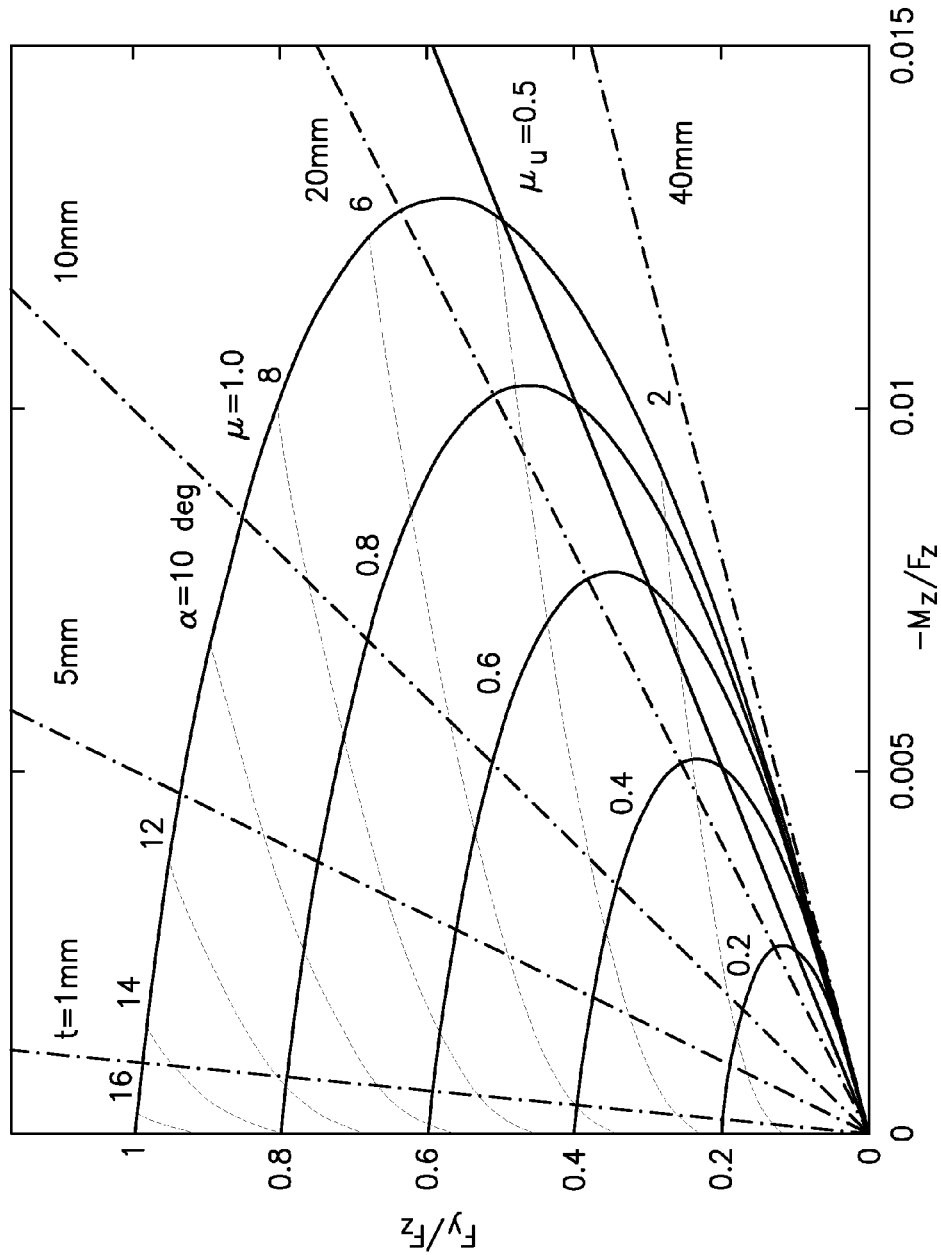
FIG. 11 is a Gough-plot using brush tire model.

FIG. 11 represents a Gough-plot using the Brush Tire Model. The ratio of Fy/Fz is plotted against the ratio $-M_z/F_z$. Lines of constant friction coefficient (solid), constant side slip angle (dotted) and constant pneumatic trail (dash-dotted) are shown in the diagram of FIG. 11. It will be noted that a pair of values ($F_y$, $M_y$) are uniquely defined for each $F_y/F_z$ coordinate for the model (1) above.

The following statements apply to the Brush Tire Model analysis:

$$F_y = \begin{cases} 3*\mu*F_z * \frac{\tan(\alpha)}{\tan(\alpha_{sliding})} * \left(1 - \left|\frac{\tan(\alpha)}{\tan(\alpha_{sliding})}\right| + \frac{1}{3} * \frac{\tan^2(\alpha)}{\tan^2(\alpha_{sliding})}\right) & \text{for } |\alpha| \leq |\alpha_{sliding}\| \\ \mu*F*\text{sign}(\alpha) & \text{for } |\alpha| > |\alpha_{sliding}\| \end{cases} \quad (1)$$

Where $\mu = \mu = \frac{2*C_{py}*a^2*\tan(\alpha_{sliding})}{3F_z}$

Substitute express for tan(αsliding) to eq (1) to get:

$$(27*\mu^2*F_z^2) - \left(\frac{18*\mu*F_z*\tan\alpha*C_{py}*a^2}{1-\left(\frac{Fy}{2*C_{py}*a^2*\tan(\alpha)}\right)}\right) + \left(\frac{4*\tan^2\alpha*C_{py}^2*a^4}{1-\left(\frac{Fy}{2*C_{py}*a^2*\tan(\alpha)}\right)}\right) = 0 \quad (2)$$

The side force and self aligning torque are two linearly independent functions of side slip angle and friction coefficient, provided the tire is partially sliding. An estimate of friction can therefore be made as soon as the tire is partially sliding.

Figure 12:
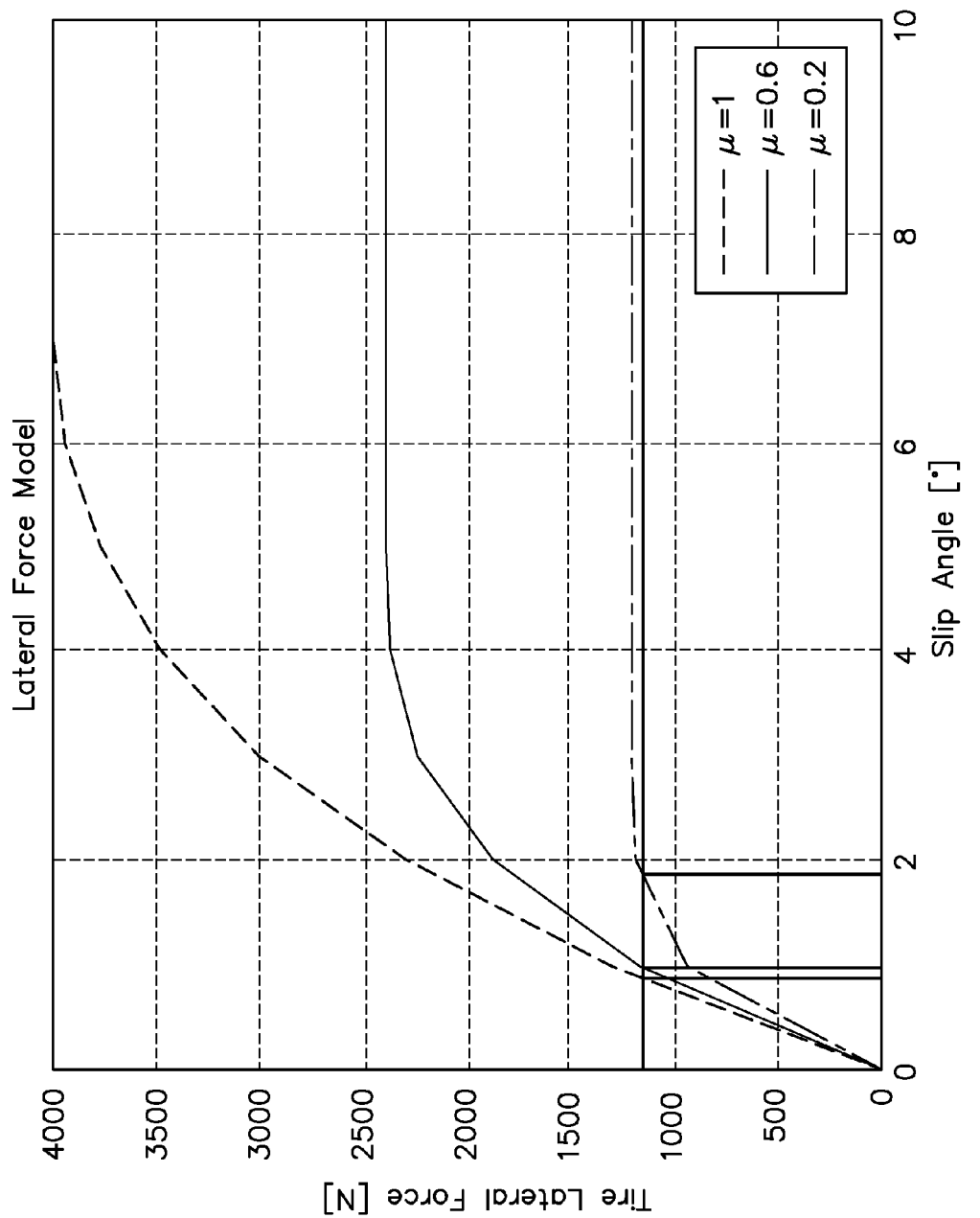
FIG. 12 is a graph of the brush tire model showing tire lateral force vs. slip angle for three coefficient of friction values: 1, 0.6, 0.2 at a normal loading $F_z$ of 4000 N.

FIG. 12 represents a graph of tire lateral force [N] vs. slip angle [degrees] for three co-efficient of friction mu values of 1, 0.06, and 0.2. It will be appreciated that by determining lateral force vs. slip angle, an estimation of coefficient of friction can be made by solving equations (2) above for $\mu$.

Friction coefficient estimation results are presented in the table below for three slip angle conditions. From the results, it is shown that the slip angle, normal force, and lateral force values define a unique estimation of friction coefficient for both low and high friction surfaces.

TABLE 2

| Slip Angle (α) | Friction Surface | Normal Force [N] | Lateral Force [N] | Friction Co-efficient |
|---|---|---|---|---|
| α = 1.5 | Low | 4000 | 770 | μ = 0.21 |
| α = 1.5 | High | 4000 | 1700 | μ = 0.83 |
| α = 2.5 | Low | 4500 | 990 | μ = 0.24 |
| α = 2.5 | High | 4500 | 2600 | μ = 0.805 |
| α = 4 | Low | 5000 | 1015 | μ = 0.22 |
| α = 4 | High | 5000 | 6950 | μ = 0.81 |

From the foregoing, it will be appreciated that the subject system and method of estimating a road coefficient of friction utilizes direct measurement of tire variables using wireless sensors 14 embedded inside the tire. Existing control systems have limited information regarding tire deformations, traction forces and road surface conditions. By implementing an "intelligent" tire technology, elimination of vehicle sensors may be possible as tire-based sensors provide accurate, reliable and real-time information about the magnitudes, directions, and limits of forces for each tire. In addition, accurate and real-time estimation of tire variables may be used to avoid tire saturation during an emergency maneuver. Early warning systems can benefit from these estimations to inform drivers about diminishing road traction abilities when the vehicle hits a slippery road surface or when the driver makes excessive steering. The information produced using the subject system and method, namely the magnitudes, directions, and limits of forces for each tire and estimation of road coefficient of friction, can be used in a predictive control framework in order to design more reliable lateral and longitudinal control systems for active systems.

Techniques proposed heretofore for the tire slip angle, force and friction coefficient estimations prior to the subject invention, depend chiefly on the vehicle sensors such as engine torque sensor, throttle position sensor, steering angle sensor, wheel speed sensor, yaw rate sensor, GPS receiver, strain gauges, steering torque, etc. The type and number of sensors used change according to the vehicle. The indirect techniques used in the existing control systems are generally known as "observer based techniques", since the tire slip angle and traction force observers are designed based on the vehicle models and the measured vehicle states. The main goal of these observers is to identify the slip-force curve that corresponds to the current operating condition of the tire and thereby estimate the current limit of the traction force, i.e. the tire-road friction coefficient. A primary disadvantage of the observer based techniques is that they do not work under steady state driving conditions, i.e. when the vehicle speed is constant and the steering wheel angle is close to zero. A minimum acceleration/deceleration or steering of the vehicle is required for tire-road friction coefficient parameter to converge to its correct value. Since the vehicle is not likely to always be accelerating/decelerating or cornering, this means that the friction coefficient cannot be continuously updated. A secondary disadvantage in known observer based techniques is that the slip and force observers are usually based on lateral/longitudinal vehicle models whose predictive outputs mis-predict during extreme combined maneuvers.

In contrast to such known observer based techniques, the subject invention system and method presents a tire-vehicle integrated tire-road friction coefficient estimation approach which makes use of sensor information from an intelligent tire and vehicle CAN bus information [as shown in FIG. 2]. The sensor signal 16 from an intelligent tire 12 [FIG. 1] are used to estimate the tire dynamic load ($F_z$) 26 and slip angle 28. Co-pending U.S. patent application Ser. Nos. 13/609,695 and 61/734,526, respectively incorporated herein, show estimation systems and methods for estimating load and slip angle based on strain sensor detected tire deformation. The vehicle CAN bus information is used to make an estimate of the tire lateral and longitudinal forces ($F_x$, $F_y$) using a dynamic observer as shown in FIG. 2. Thereafter, a sensor fusion approach is used to combine the intelligent tire and vehicle information and make an estimate of the tire-road friction coefficient. The performance of the subject system and method when tested and compared with real experimental data acquired on a test vehicle, demonstrates and verifies the ability of this approach to provide accurate estimation of friction coefficient.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A road friction coefficient estimation system for calculating a road friction coefficient estimation comprising:
at least one front tire and at least one rear tire supporting a vehicle, at least one tire having at least one strain sensor mounted to the tire for generating a strain sensor signal;
a tire load estimator generating a load estimation on the one tire from the strain sensor signal;
a tire slip angle estimator generating a slip angle estimation for the one tire from the strain sensor signal and the load estimation;
a plurality of vehicle-based sensors for measuring a plurality of vehicle operational parameters;
a model-based friction estimator generating an estimated road surface friction coefficient based on the plurality of vehicle operational parameters, the load estimation, and the slip angle estimation.

2. The road friction coefficient estimation system of claim 1, wherein the vehicle operational parameters measured by the vehicle-based sensor means are taken from the group: (vehicle yaw rate, vehicle acceleration).

3. The road friction coefficient estimation system of claim 2, wherein comprising a first sensor and a second sensor affixed to an inner sidewall and an outer sidewall of the one tire, the first and second sensors operative to measure a tire strain in the inner and outer sidewalls and generate first and second strain signals indicative of the measurement of tire strain in the inner and outer sidewalls.

4. The road friction coefficient estimation system of claim 3, wherein the tire slip angle estimator operatively compares the sidewall strain signals from the inner sidewall sensor and the outer sidewall sensor of each tire.

5. The road friction coefficient estimation system of claim 4, wherein:
the tire load estimator operatively averages a power magnitude of the strain signals from the first and second sensors; and
the slip angle estimator operatively estimates a difference between slopes of the strain signals from the first and second sensors.

6. A road friction coefficient estimation system for calculating a road friction coefficient estimation comprising:
a vehicle having a plurality of supporting tires;
a tire load estimator generating a dynamic load estimation on each of the plurality of tires from a strain signal received from at least one tire-based strain sensor mounted to a sidewall of each of the plurality of tires;
a tire slip angle estimator generating a dynamic slip angle estimation on each of the plurality of tires from the strain signal received from the at least one tire-based strain sensor mounted to each of the plurality of tires;
a plurality of vehicle sensors measuring vehicle acceleration and yaw rate operational parameters;
a dynamic observer model for calculating lateral and longitudinal force estimates on each of the plurality of tires;
a load transfer ratio calculator generating an estimated load transfer ratio from the estimated dynamic load on each of the plurality of tires;
an individual wheel force estimator calculating an individual wheel force estimation on each of the plurality of tires from the lateral and longitudinal force estimates on each of the plurality of tires; and
a model-based friction estimator calculating a surface friction coefficient estimation based on the dynamic slip angle estimation on each of the plurality of tires, the individual wheel force estimation on each of the plurality of tires, and the dynamic load estimation on each of the plurality of tires.

7. The road friction coefficient estimation system of claim 6, wherein the tire load estimator generates a dynamic load estimation on each of the plurality of tires from a strain signal generated by at least one tire-based strain sensor mounted to each of an inner sidewall and an outer sidewall of each of the plurality of tires and;
the tire slip angle estimator generates a dynamic slip angle estimation for each of the plurality of tires from a comparison of the strain signals from the inner and outer sidewalls of each of the plurality of tires.

8. The road friction coefficient estimation system of claim 6, wherein the dynamic observer model comprises a single-track, three degree-of-freedom model.

9. The road friction coefficient estimation system of claim 6, wherein the individual wheel force estimator comprises a four-wheel vehicle model.

10. The road friction coefficient estimation system of claim 6, wherein the model-based friction estimator comprises a Brush-tire model.

11. The road friction coefficient estimation system of claim 10, wherein the friction estimator operates in real time based upon tire sensor-obtained variables of slip angle and tire load and observer-derived estimations of forces on each of the plurality of tires.

12. The road friction coefficient estimation system of claim 11, wherein the dynamic observer model comprises a single-track, three degree-of-freedom model.

13. The road friction coefficient estimation system of claim 12, wherein the individual wheel force estimator comprises a four-wheel vehicle model.

14. The road friction coefficient estimation system of claim 13, wherein the model-based friction estimator comprises a Brush-tire model.

15. A method of estimating road friction coefficient comprising:
- equipping each tire in a plurality of tires supporting the vehicle with at least one tire-mounted strain sensor measuring strain within a tire sidewall and generating a strain signal;
- generating a dynamic load estimation on each of the plurality of tires based upon the strain signal;
- generating a dynamic slip angle estimation for each of the plurality of tires from a strain signal transmitted by the at least one tire-mounted strain sensor mounted to each of the plurality of tires;
- measuring vehicle acceleration and yaw rate operational parameters using vehicle-mounted sensors;
- calculating lateral and longitudinal force estimates on each of the plurality of tires using a dynamic observer model;
- calculating an estimated load transfer ratio from the estimated dynamic load on each of the plurality of tires;
- calculating an individual wheel force estimation on each of the plurality of tires from the lateral and longitudinal force estimates on each of the plurality of tires; and
- calculating an estimated road surface friction coefficient based on the dynamic slip angle estimation on each of the plurality of tires, the estimated dynamic load on each of the plurality of tires, and the individual wheel force estimation on each of the plurality of tires.

16. The method of estimating road friction coefficient of claim 14, wherein the road surface friction coefficient estimation is based on real time tire sensor-obtained estimations of slip angle and tire load in combination with observer-derived estimations of forces on each of the plurality of tires derived from vehicle sensor-obtained vehicle parameters.

17. The method of estimating road friction coefficient of claim 15, wherein comprising using a single-track, three degree-of-freedom model to calculate the lateral and longitudinal force estimates on the plurality of tires.

18. The method of estimating road friction coefficient of claim 16, wherein comprising using a four-wheel vehicle model to calculate the individual wheel force estimation on the plurality of tires.

19. The method of estimating road friction coefficient of claim 17, wherein comprising using a Brush-tire model for calculating the road surface friction coefficient.

* * * * *